(12) United States Patent
Sukegawa (10) Patent No.: US 11,630,628 B2
(45) Date of Patent: Apr. 18, 2023

(54) DISPLAY SYSTEM

(71) Applicant: Alps Alpine Co., LTD, Tokyo (JP)

(72) Inventor: Ryo Sukegawa, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/740,892

(22) Filed: May 10, 2022

(65) Prior Publication Data
US 2022/0374184 A1    Nov. 24, 2022

(30) Foreign Application Priority Data
May 18, 2021   (JP) .............................. JP2021-083806

(51) Int. Cl.
    G06F 3/14    (2006.01)
    G06F 3/01    (2006.01)

(52) U.S. Cl.
    CPC ................ *G06F 3/14* (2013.01); *G06F 3/013* (2013.01); *G06F 3/017* (2013.01)

(58) Field of Classification Search
    None
    See application file for complete search history.

(56) References Cited

U.S. PATENT DOCUMENTS

| | | |
|---|---|---|
| 10,410,319 B2 | 9/2019 | Wunderlich et al. |
| 2008/0192024 A1 | 8/2008 | Mita |
| 2015/0185999 A1 | 7/2015 | Nam et al. |
| 2020/0055396 A1 | 2/2020 | Mejia Gonzalez et al. |

FOREIGN PATENT DOCUMENTS

| | | |
|---|---|---|
| EP | 3 095 635 A2 | 11/2016 |
| EP | 3 212 453 A1 | 9/2017 |
| JP | 18-184024 | 11/2018 |
| WO | WO 2016/066258 | 5/2016 |

OTHER PUBLICATIONS

Extended European Search Report from corresponding European application No. 22172261.4, dated Oct. 25, 2022, 9pp.

*Primary Examiner* — Nicholas J Lee
(74) *Attorney, Agent, or Firm* — Crowell & Moring LLP (57) ABSTRACT

When a screen to be displayed on a touch panel display includes no visual content for appreciation, such as a movie, the screen is displayed at a position closer to the user, at which the user can naturally manipulate the screen. When the screen includes a handwritten input acceptance box, the screen is placed at an upper position so that a handwriting input operation by the user is eased. When the screen includes visual content for appreciation, the screen is displayed at a position slightly distant from the user so as to be suitable for viewing the visual content for appreciation. The position suitable for appreciation is set according to the display size and resolution of the visual content, included in the screen, for appreciation.

20 Claims, 6 Drawing Sheets

DISPLAY SYSTEM

RELATED APPLICATION

The present application claims priority to Japanese Patent Application Number 2021-083806, filed May 18, 2021, the entirety of which is hereby incorporated by reference.

BACKGROUND

1. Field of the Invention

The present invention relates to a display system having a touch panel display.

2. Description of the Related Art

In a known technology related to a display system having a touch panel display, the posture of the user sitting on a seat in an automobile is detected, after which the touch panel display is moved within arm's reach of the user according to the detected posture (see JP 2018-184024 A, for example).

SUMMARY

A touch panel display mounted in an automobile is often used to, for example, display visual content for appreciation, such as a movie, besides being used to accept the user's manipulation.

If the touch panel display is within arm's reach of the user while this type of visual content for appreciation is displayed, the user may not view the visual content for appreciation comfortably because the distance is too short.

The present disclosure addresses the above problem with the object of providing a display system in which a touch panel display can be used more comfortably.

To attain the above object, a display system, in the present disclosure, that displays a screen for a user has: a touch panel display that displays the screen and accepts a manipulation performed on the screen, a position at which to display the screen being variable; and a display control means for controlling a display of the screen on the touch panel display. The display control means decides whether the screen to be displayed has visual content for appreciation according to a predetermined criterion. When the screen to be displayed includes no visual content for appreciation, the display control means displays the screen at a suitable-for-manipulation position comparatively close to the user. When the screen to be displayed has visual content for appreciation, the display control means displays the screen at a position comparatively distant from the user.

This type of display system may be configured so that the display control means calculates, as the suitable position, a position distant from the user by a distance suitable for viewing the visual content, included in the screen, for appreciation, the distance being obtained from the resolution and display size of the visual content for appreciation.

The above display system may have a gesture detection means for detecting a gesture of the user, when the user is to perform a manipulation on the screen. When the gesture detection means detects the gesture, the display control means may move the position of the displayed screen to the suitable-for-manipulation position.

The above display system may have a line-of-vision detection means for detecting the line of vision of the user with the screen displayed, when the user gazes at a display object on the displayed screen, the display object being intended to accept the user's manipulation. When the line-of-vision detection means detects the line of vision with the screen displayed, the display control means may move the position of the displayed screen to the suitable-for-manipulation position.

The above display system may have a measurement means for geometrically measuring the body of the user. The display control means may calculate, as the suitable-for-manipulation position, a position, obtained from a geometrical measurement result from the measurement means, at which the user can easily perform a manual manipulation.

The above display system may be configured so that when the screen to be displayed accepts a handwritten input, the display control means calculates, as the suitable-for-manipulation position, a position closer to the face of the user than when the screen to be displayed does not accept a handwritten input.

The above display system may be configured so that the display control means displays the screen at the suitable-for-manipulation position in such a way that the more distant the position at which to display the screen is from the user, the larger the size of the screen is.

In the above display system, the screen including visual content for appreciation may be a screen including a moving picture.

The display system described above may be a display system mounted in an automobile. The touch panel display may be a touch panel display on which the position at which to display the screen is variable in the front-back direction of the automobile.

In the display system described above, a screen including no visual content for appreciation is displayed at a position comparatively close to the user, making it easy for the user to perform a manipulation on the screen. By contrast, a screen including visual content for appreciation is displayed at a position comparatively distant from the user. Therefore, the user can comfortably view the visual content for appreciation without being subject to stress that would otherwise be caused because the screen is too close to the user.

As described above, the present invention can provide a display system in which a touch panel display can be used more comfortably.

BRIEF DESCRIPTION OF THE DRAWINGS

FIGS. 7A1 and 7A2 and 7B1 to 7B4 illustrate another example of the structure of the vehicle-mounted system according to the embodiment of the present invention.

DETAILED DESCRIPTION OF THE PREFERRED EMBODIMENTS

An embodiment of the present invention will be described below by taking application to a vehicle-mounted system in an automobile as an example.

Figure 1:
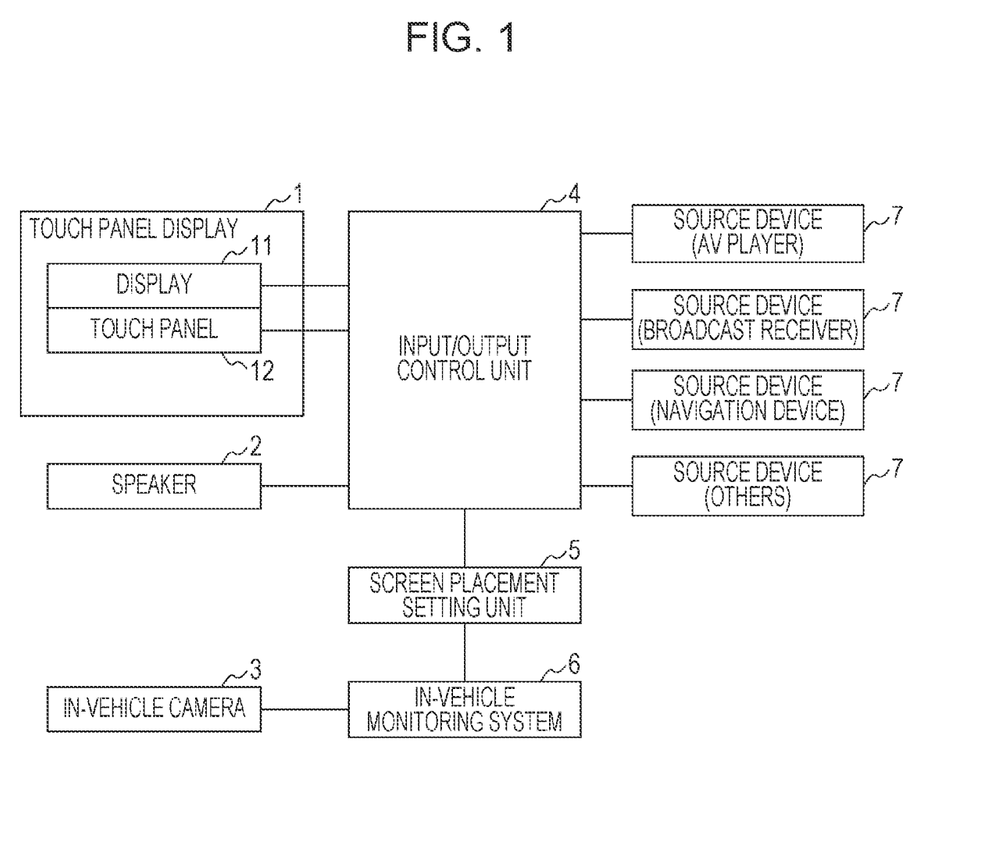
FIG. 1 is a block diagram illustrating the structure of a vehicle-mounted system according to an embodiment of the present invention.

FIG. 1 illustrates the structure of a vehicle-mounted system.

As illustrated in the drawing, the vehicle-mounted system has a touch panel display 1, a speaker 2, an in-vehicle camera 3, an input/output control unit 4, a screen placement setting unit 5, an in-vehicle monitoring system 6, and a plurality of source devices 7.

The source devices 7 are an audio visual (AV) player, a broadcast receiver, a car navigation device, and other devices. In the operation of each source device 7, the touch panel display 1 is used to accept a display output and a user's manipulation through the input/output control unit 4.

The touch panel display 1 has a display 11 and a touch panel 12 that detects the user's touch on the display screen of the display 11.

Figure 2A:
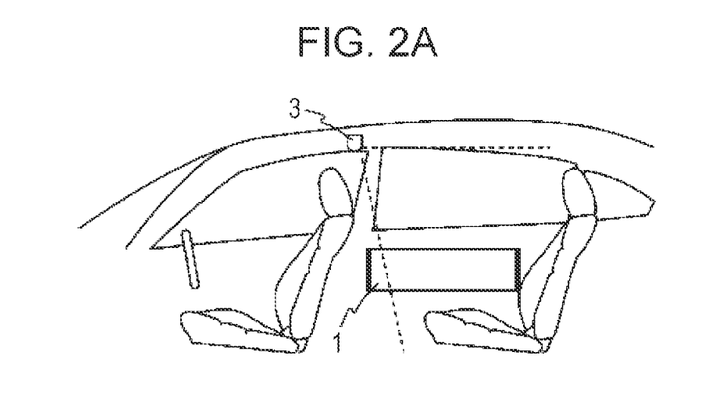
FIGS. 2A and 2B illustrate placement in the vehicle-mounted system according to the embodiment of the present invention.
Figure 2B:
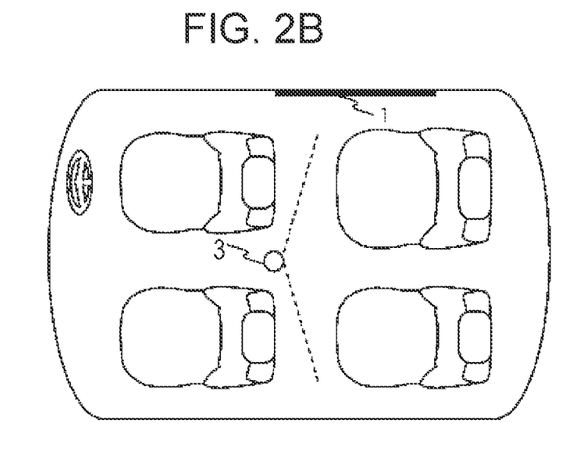

Now, this embodiment will be described by taking, as an example, a case in which the touch panel display 1 is long in a horizontal direction, matching the front-back direction of the automobile, of the display area and is placed on the side surface of the automobile interior on the right side of the rear-right seat in the automobile, as illustrated in FIGS. 2A and 2B.

The in-vehicle camera 3 is attached to, for example, the ceiling of the automobile interior, as illustrated in FIGS. 2A and 2B. The in-vehicle camera 3 takes a picture of the state of the user sitting on the rear-right seat. The in-vehicle camera 3 may be an infrared camera and is preferably a stereo camera that can measure a three-dimensional position.

Figure 3:
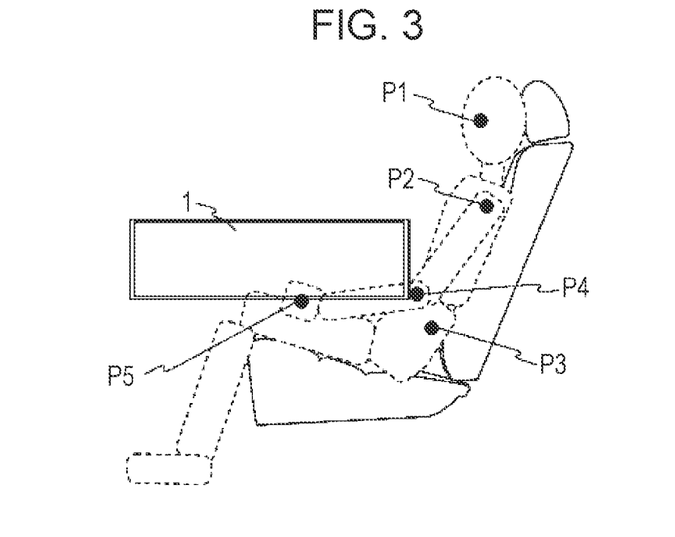
FIG. 3 illustrates positions at which measurement is performed in the embodiment of the present invention.

Referring again to FIG. 1, the in-vehicle monitoring system 6 monitors various situations in the automobile interior from pictures taken by the in-vehicle camera 3. The in-vehicle monitoring system 6 also geometrically measures the body of the user sitting on the rear-right seat. In this geometrical measurement, the in-vehicle monitoring system 6 measures the position P1 of the user's eye, the position P2 of the user's shoulder, the position P3 of the user's waist, the position P4 of the user's elbow, and the position P5 of the user's hand, as illustrated in FIG. 3. The position of the waist is substantially constant with respect to the surface of the seat, regardless of the user's body build. Therefore, the constant position may be set in advance as the position P3 of the waist.

The in-vehicle monitoring system 6 also calculates the length from the shoulder to the elbow, the length from the elbow to the hand, and the direction from the shoulder toward the waist, from the measured positions.

Referring again to FIG. 1, the screen placement setting unit 5 accepts a screen placement setting request from the input/output control unit 4, after which the screen placement setting unit 5 sets, as screen placement, a position at which to display the screen on the touch panel display 1 and the size of the screen to be displayed in the input/output control unit 4. Operation for this screen placement setting will be described later in detail.

The input/output control unit 4 performs control to display a screen output from the relevant source device 7 on the touch panel display 1, output a voice output from the relevant source device 7 to the speaker 2, and accept, from the relevant source device 7, the user's manipulation performed by using the touch panel display 1.

When a switchover is made to select a screen to be displayed on the touch panel display 1 in response to the user's manipulation or the like, the input/output control unit 4 issues a screen placement setting request and accepts a screen placement setting from the screen placement setting unit 5. The input/output control unit 4 then displays the selected screen at the position, on the touch panel display 1, matching the screen placement set by the screen placement setting unit 5 and with the size matching the screen placement.

Operation performed by the screen placement setting unit 5 to set screen placement in the input/output control unit 4 will be described below.

Figure 4:
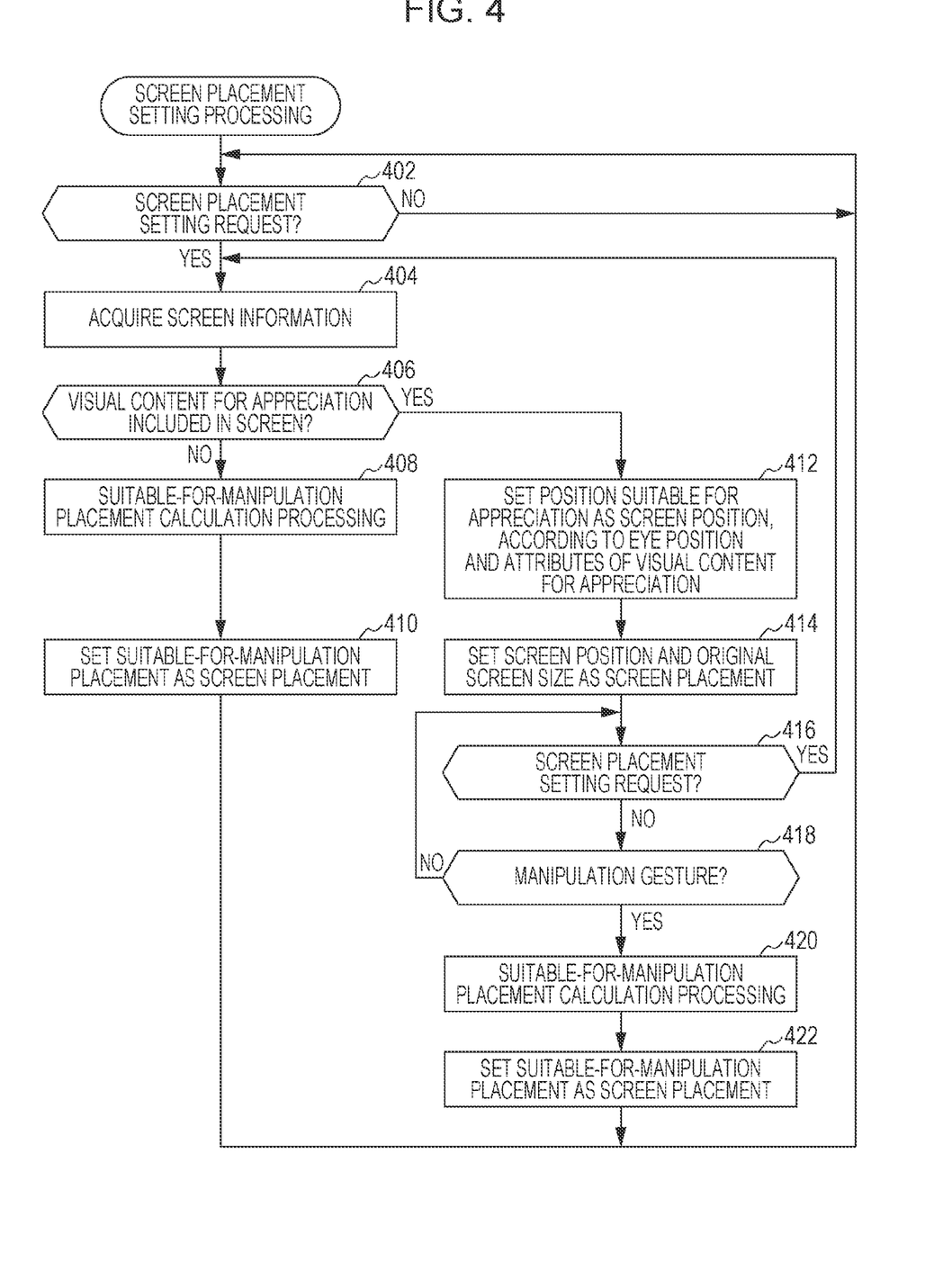
FIG. 4 is a flowchart illustrating screen placement setting processing according to the embodiment of the present invention.

FIG. 4 illustrates a procedure for screen placement setting processing performed by the screen placement setting unit 5.

As illustrated in the flowchart, if the screen placement setting unit 5 accepts, in screen placement setting processing, a screen placement setting request from the input/output control unit 4 (Yes in step 402), the screen placement setting unit 5 issues a screen information request to the input/output control unit 4 and acquires screen information (step 404).

When the input/output control unit 4 issues a screen placement setting request during the selection of a screen to be displayed on the touch panel display 1, if the input/output control unit 4 receives a screen information request from the screen placement setting unit 5, the input/output control unit 4 submits information about the selected screen to the screen placement setting unit 5 as screen information. Screen information includes the size of the screen and information about content included in the screen. Information about content includes the type of each piece of content and its attributes. As types of content, there are a moving picture, a still picture, a slideshow, a virtual manipulator, text, and a handwritten input acceptance box. When content is a moving picture, still picture, or slideshow, the display size of the content and its resolution are included as the attributes of the content. The input/output control unit 4 is notified of screen information about the selected screen from the source device 7 from which the selected screen is output. However, the input/output control unit 4 may analyze the structure of the selected screen and may be notified of screen information. Alternatively, the input/output control unit 4 may set screen information in advance for each type of screen to be output from the relevant source device 7.

Next, when the screen placement setting unit 5 acquires screen information (step 404), the screen placement setting unit 5 decides, from content information included in the screen information, whether visual content for appreciation is included in the selected screen (step 406). Visual content for appreciation is a type of visual content intended for appreciation. When, in step 406, the content information indicates that a moving picture is included in the screen, the screen placement setting unit 5 decides that visual content for appreciation is included in the screen. However, only when the included moving picture has a display size larger than a predetermined value or a ratio with which the included moving picture occupies the screen is larger than a predetermined value, the screen placement setting unit 5 may decide that visual content for appreciation is included in the screen.

When the display system displays a slideshow as well, the screen placement setting unit 5 may decide that visual content for appreciation is included in the screen when a slideshow is included, besides when a moving picture is included. In this case as well, only when the included slideshow has a display size larger than a predetermined value or a ratio with which the included slideshow occupies the screen is larger than a predetermined value, the screen placement setting unit 5 may decide that visual content for appreciation is included in the screen.

When the display system displays a still picture for appreciation, such as a photo, as well, the screen placement setting unit 5 may decide that visual content for appreciation is included in the screen only when a still picture has a screen size larger than a predetermined size and also has a resolution higher than a predetermined value.

Alternatively, types of screens to be output from source devices 7 may have been stored in correspondence to indication as to whether the screen is intended to submit visual content for appreciation. When the correspondence indicates that the type of selected screen is intended to submit visual content for appreciation, the screen placement setting unit 5 may decide that visual content for appreciation is included in the screen.

If visual content for appreciation is not included in the selected screen (No in step 406), the screen placement setting unit 5 performs suitable-for-manipulation placement calculation processing (step 408).

Figure 5:
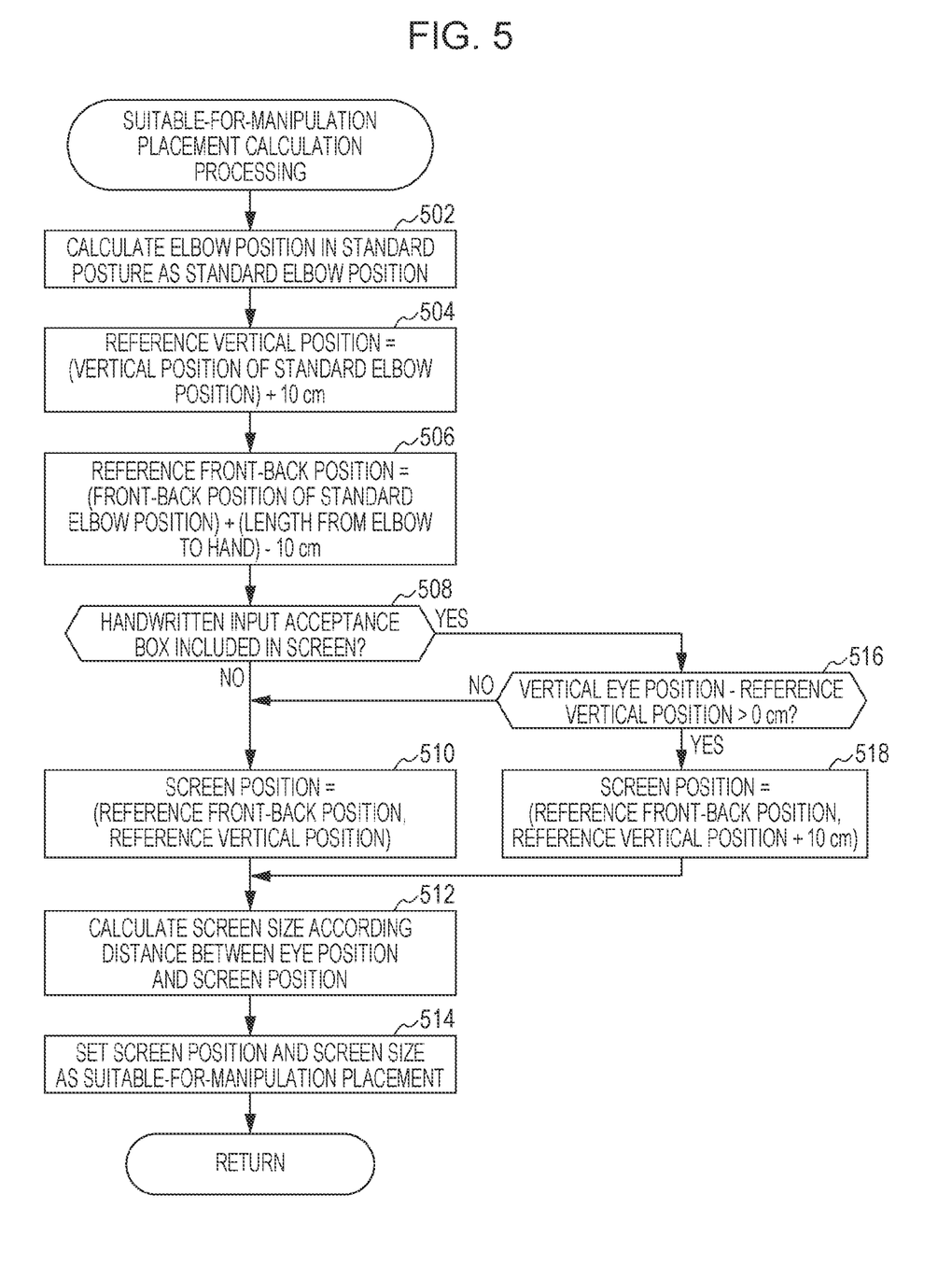
FIG. 5 is a flowchart illustrating suitable-for-manipulation placement calculation processing according to the embodiment of the present invention.

FIG. 5 illustrates a procedure for this suitable-for-manipulation placement calculation processing.

As illustrated in the drawing, in suitable-for-manipulation placement calculation processing, the screen placement setting unit 5 first calculates, as a standard elbow position, a position distant from the position of the shoulder, the position being measured by the in-vehicle monitoring system 6, by an amount equal to the length from the shoulder to the elbow in the direction from the shoulder toward the waist (step 502). This standard elbow position is equivalent to the position of the elbow when the user is in a standard posture in which the user's upper arm is along the body. However, the elbow position measured by the in-vehicle monitoring system 6 may be calculated as the standard elbow position without alteration. When the rear-right seat has an armrest and the user is in a posture in which the elbow is on the armrest or in the standard posture, the position of the elbow on the armrest, the position being measured by the in-vehicle monitoring system 6, is calculated as the standard elbow position without alteration.

The screen placement setting unit 5 then sets a position in the vertical direction, the position being 10 cm above the standard elbow position in the vertical position, as a reference vertical position (step 504). This reference vertical position is substantially the same as the position of the elbow in the vertical position when the elbow is slightly raised upward from the standard posture in which the user's upper arm is along the body.

The screen placement setting unit 5 also sets a position in the front-back direction, the position being ahead of the standard elbow position in the front-back direction by an amount equal to the length from the elbow to the hand and then 10 cm behind the position ahead of the standard elbow position (step 506), as a reference front-back position. This reference front-back position is substantially the same as the position of the hand in the front-back direction when the user slightly raises the elbow upward from the standard posture in which the user's upper arm is along the body and then naturally stretches the arm forward and up.

Next, the screen placement setting unit 5 decides whether a handwritten input acceptance box is included in the selected screen, according to the acquired screen information (step 508). The handwritten input acceptance box refers to an area, on the screen, where a handwritten input is accepted from the user.

If no handwritten input acceptance box is included (No in step 508), the screen placement setting unit 5 sets, as a screen position, a position located in the display area on the touch panel display 1, the position being equivalent to a front-back vertical position, the front-back position of which is the reference front-back position and the vertical position of which is the reference vertical position (step 510). Then, the process proceeds to step 512.

If a handwritten input acceptance box is included (Yes in step 508), the screen placement setting unit 5 checks whether the vertical eye's position, which is being measured by the in-vehicle monitoring system 6, is above the vertical center position of the touch panel display 1 (step 516). If the vertical eye's position is not above the vertical center position (No in step 516), the screen placement setting unit 5 sets, as the screen position, a position located in the display area on the touch panel display 1, the position being equivalent to a front-back vertical position, the front-back position of which is the reference front-back position and the vertical position of which is the reference vertical position (step 510). Then, the process proceeds to step 512.

If the vertical eye's position is above the vertical center position of the touch panel display 1 (Yes in step 516), the screen placement setting unit 5 sets, as the screen position, a position located in the display area on the touch panel display 1, the position being equivalent to a front-back vertical position, the front-back position of which is the reference front-back position and the vertical position of which is 10 cm above the reference vertical position (step 518). If the position 10 cm above the reference vertical position is above the vertical eye's position, however, the screen placement setting unit 5 sets, as the screen position, a position located in the display area on the touch panel display 1, the position being equivalent to a front-back vertical position, the front-back position of which is the reference front-back position and the vertical position of which is the vertical eye's position.

Then, the process proceeds to step 512.

The reason why, as described above, the screen position when a handwritten input acceptance box is included in the screen is 10 cm above the screen position when no handwritten input acceptance box is included is to bring the handwriting position closer to the face so that a handwriting operation by the user is eased.

After the screen position has been set in step 510 or 518 and the process proceeds to step 512, the screen placement setting unit 5 sets a screen size according to distance between the set screen position and the eye's position measured by the in-vehicle monitoring system 6 so that the longer the distance is, the larger the screen size is within a range in which the screen fits in the display area on the touch panel display 1.

The screen placement setting unit 5 sets the set screen position and screen size as suitable-for-manipulation placement (step 514). Then, the process returns to screen placement setting processing.

FIG. 4 will be referenced again. After having performed suitable-for-manipulation placement calculation processing in step 408, the screen placement setting unit 5 sets suitable-for-manipulation in the input/output control unit 4 as screen placement (step 410). Then, the process returns to processing starting from step 402.

If visual content for appreciation is included in the selected screen (Yes in step 406), the screen placement setting unit 5 sets, as the screen position, a position in the display area on the touch panel display 1, the position being suitable for viewing visual content included in the screen for appreciation, according to the eye's position measured by the in-vehicle monitoring system 6 and to the display size and resolution, which are attributes of the visual content for appreciation (step 412). The position suitable for viewing visual content for appreciation is, for example, the position at which the distance between the eye and the screen is n times the vertical size of the visual content for appreciation. The screen placement setting unit 5 sets the number n of n times according to the resolution so that the lower the resolution of the visual content for appreciation is, the larger the number n is.

The screen placement setting unit 5 sets, as screen placement, screen position and original screen size in the input/output control unit 4 (step 414). The original screen size, which is the size of the original screen, is of a type in which the resolution and display size of the displayed visual content for appreciation remain unchanged.

After having set screen placement in step 414, the screen placement setting unit 5 monitors whether a screen placement setting request has been received from the input/output control unit 4 (step 416) and whether a manipulation gesture has occurred (step 418).

The manipulation gesture is a type of gesture performed by the user sitting on the rear-right seat to attempt to manipulate the screen displayed on the touch panel display 1. In step 418, the screen placement setting unit 5 decides that a manipulation gesture has occurred when, for example, the hand's position that is being measured by the in-vehicle monitoring system 6 has moved through a predetermined distance or more toward the displayed screen.

If a screen placement setting request has been received (Yes in step 416), the process returns to processing starting from step 404.

If a gesture has occurred (Yes in step 418), the screen placement setting unit 5 performs suitable-for-manipulation placement calculation processing illustrated in FIG. 5 to calculate suitable-for-manipulation placement (step 420), and sets the suitable-for-manipulation placement in the input/output control unit 4 as screen placement (step 422). Then, the process returns to processing starting from step 402.

When suitable-for-manipulation placement is set as screen placement in step 422, the input/output control unit 4 changes the position and size of the displayed screen according the set screen placement. As a result, the displayed screen moves to a position, closer to the user, at which the user can perform manipulation easily, in response to the user's operation to attempt to perform manipulation.

This completes the description of screen placement setting processing performed by the screen placement setting unit 5.

In the in-vehicle monitoring system 6, the screen placement setting unit 5 may detect the line of vision of the user sitting on the rear-right seat from a picture taken by the in-vehicle camera 3. Then, processing in step 418 in screen placement setting processing may be to monitor the occurrence of the line of vision of the user who gazes at a display object, in the displayed screen, intended to accept the user's manipulation, instead of or together with monitoring a manipulation gesture.

The display object intended to accept the user's manipulation is a display object that accepts the user's manipulation, the display object being one of multiple display objects, which are part of elements constituting the screen. Examples of this type of display object include a handwritten input acceptance box and a virtual manipulator such as a button or key.

When, in step 418, the screen placement setting unit 5 monitors the occurrence of the line of vision of the user who gazes at a display object intended to accept the user's manipulation, instead of monitoring a manipulation gesture, if the screen placement setting unit 5 detects the occurrence of the line of vision in step 418, the process proceeds to step 420. If not, the process returns to step 416. When, in step 418, the screen placement setting unit 5 monitors the occurrence of the line of vision of the user who gazes at a display object intended to accept the user's manipulation, together with monitoring a manipulation gesture, if the screen placement setting unit 5 detects the occurrence of either of a gesture and the line of vision in step 418, the process proceeds to step 420. If the screen placement setting unit 5 detects the occurrence of neither a gesture nor the line of vision, the process returns to step 416.

This completes the description of operation performed by the screen placement setting unit 5 to set screen placement in the input/output control unit 4.

Figure 6A:
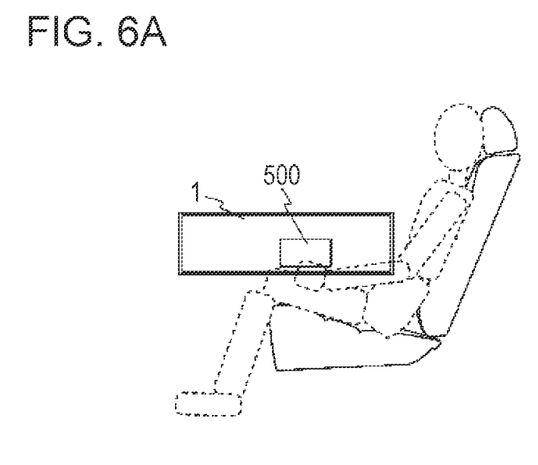
FIGS. 6A to 6D illustrate an example of screen placement setting processing according to the embodiment of the present invention.
Figure 6B:
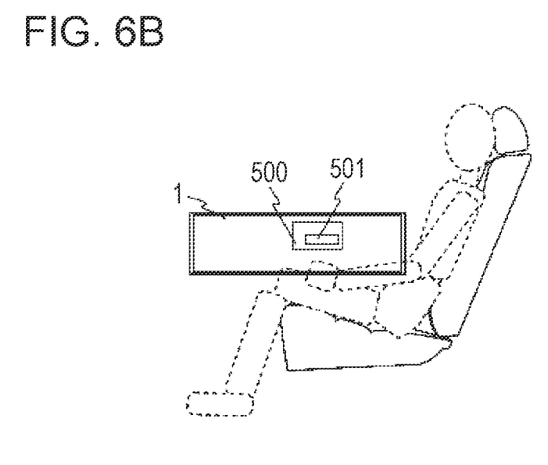

In this operation performed by the screen placement setting unit 5, when the screen includes no visual content for appreciation, a screen 500 is displayed at a position, close to the user, at which the user can manipulate the screen 500 with a natural operation, as illustrated in FIGS. 6A and 6B.

FIG. 6A illustrates screen placement when the screen 500 includes no handwritten input acceptance box. FIG. 6B illustrates screen placement when the screen 500 includes a handwritten input acceptance box 501. As illustrated in these drawings, when the screen 500 includes the handwritten input acceptance box 501, the screen 500 is positioned slightly close to the face, making it easy for the user to enter a handwritten input.

Figure 6C:
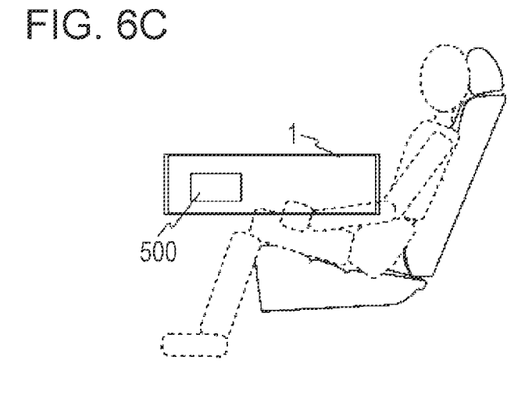
Figure 6D:
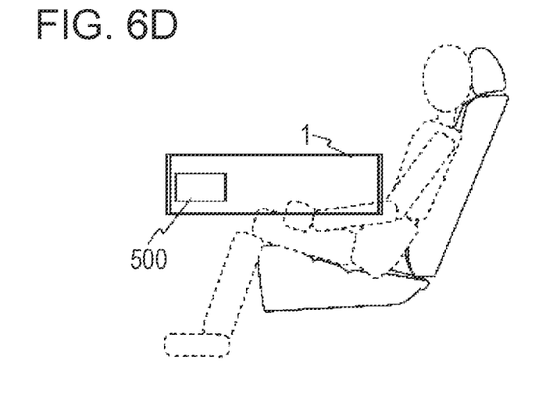

When the screen 500 includes visual content for appreciation, the screen 500 is displayed at a position slightly distant from the user so that the position is suitable for viewing visual content for appreciation, as illustrated in FIGS. 6C and 6D.

The visual content for appreciation in FIGS. 6C and 6D is included in the screen 500 with the same display size and at the same position on the screen 500. However, FIG. 6C illustrates screen placement when the visual content for appreciation has high resolution, and FIG. 6D illustrates screen placement when the visual content for appreciation has low resolution. As illustrated in these drawings, according to the resolution of visual content included in the screen 500 for appreciation, the screen 500 is placed so that the distance from the user to the screen 500 is suitable for viewing the visual content, having the resolution, for appreciation. The position at which the screen 500 is placed varies with the resolution. Placement of the screen 500 including visual content for appreciation is set depending on not only the resolution of the visual content for appreciation but also the display size, as described above.

This completes the description of the embodiment of the present invention.

In this embodiment, as described above, a screen including no visual content for appreciation is displayed at a position comparatively close to the user, making it easy for the user to perform a manipulation on the screen. By contrast, a screen including visual content for appreciation is displayed at a position comparatively distant from the user. Therefore, the user can comfortably view the visual content for appreciation without being subject to stress that would otherwise be caused because the screen is too close to the user.

The above embodiment has been described for a case in which a single touch panel display 1 is placed only on the side surface of the automobile interior on the right side of the rear-right seat in the automobile. However, the number of touch panel displays 1 and their placement can have various aspects.

For example, the touch panel display 1 may be placed on the side surface of the automobile interior on the left side of the rear-left seat. Alternatively, touch panel displays 1 may be placed on the side surface of the automobile interior on the right side of the rear-right seat and the side surface of the automobile interior on the left side of the rear-left seat, one for each side surface.

Figure 7A:
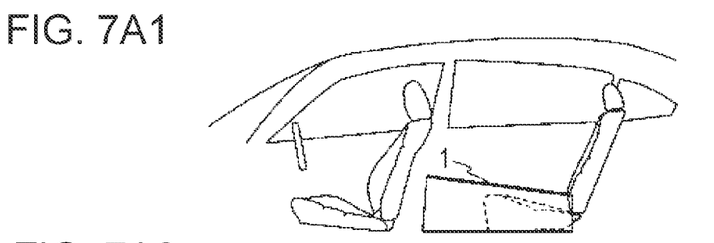
Figure 7A:
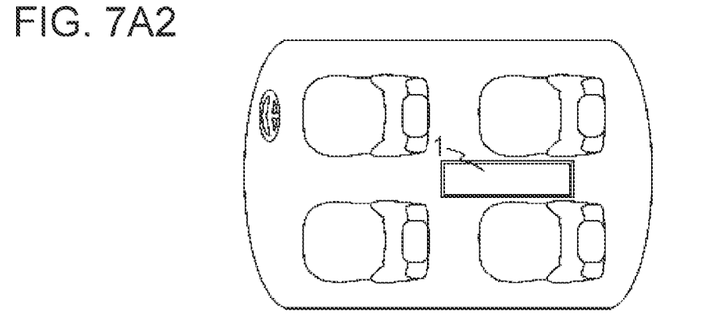

Alternatively, the touch panel display 1 that is long in a horizontal direction, matching the front-back direction of the automobile, of the display area may be disposed, for example, between the rear-right seat and rear-left seat of the automobile as illustrated in FIGS. 7A1 and 7A2.

Figure 7B:
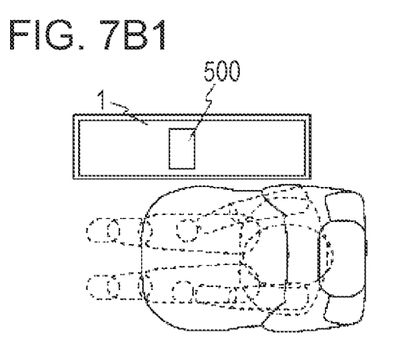
Figure 7B:
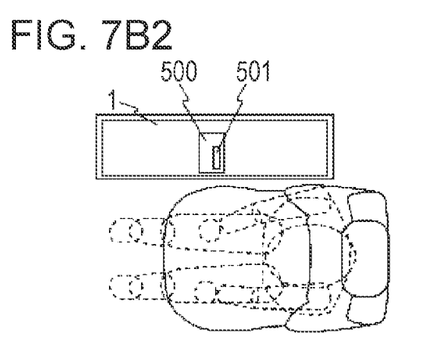
Figure 7B:
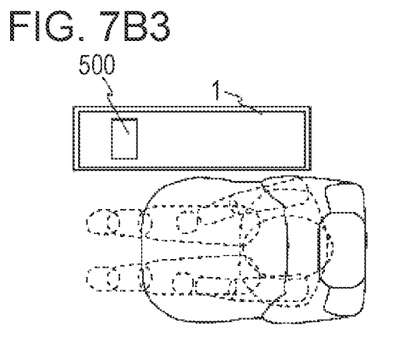
Figure 7B:
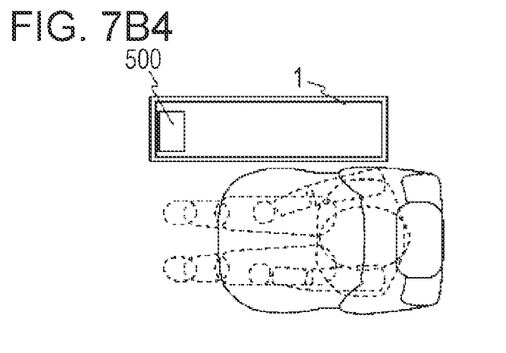

In this case as well, when the screen 500 includes no visual content for appreciation, the screen 500 is displayed on the touch panel display 1 so that the screen 500 is placed at a position, close to the user, at which the user can naturally manipulate the screen 500, as illustrated in FIGS. 7B1 and 7B2. When the screen 500 includes the handwritten input acceptance box 501, the screen 500 is displayed so that it is brought slightly closer to the user, who is using the touch panel display 1, in the left-right direction as illustrated in FIG. 7B2, than when the screen 500 includes no handwritten input acceptance box 501 as illustrated in FIG. 7B1. This makes it easy for the user to enter a handwritten input.

When the screen 500 includes visual content for appreciation, the screen 500 is displayed at a position more distant from the user as illustrated in FIGS. 7B3 and 7B4, the position being suitable for the user to view the visual content for appreciation, than when the screen 500 includes no visual content for appreciation as illustrated in FIGS. 7B1 and 7B2. According to the resolution and display size of visual content for appreciation, the visual content being included in the screen 500, the screen 500 is displayed so that the distance from the user to the screen 500 is suitable for viewing the visual content, having the resolution and display size, for appreciation. The position at which the screen 500 is displayed varies with the resolution and display size.

In the above embodiment, screen placement has been varied by varying the display position of the screen in the display area on the touch panel display 1. However, screen placement may be varied by moving the touch panel display 1 itself.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A display system that displays a screen for a user, the system comprising:
   a touch panel display that displays the screen and accepts a manipulation performed on the screen, a position at which to display the screen being variable; and
   a display control means for controlling a display of the screen on the touch panel display; wherein
   the display control means determines whether the screen to be displayed has visual content for appreciation according to a predetermined criterion; if the screen to be displayed includes no visual content for appreciation, the display control means displays the screen at a suitable-for-manipulation position comparatively close to the user; if the screen to be displayed has visual content for appreciation, the display control means displays the screen at a position comparatively distant from the user.

2. The display system according to claim 1, wherein if the screen to be displayed has visual content for appreciation, the display control means calculates a position distant from the user by a distance suitable for viewing the visual content, included in the screen, for appreciation, the distance being obtained from a resolution of the visual content for appreciation and a display size of the visual content for appreciation.

3. The display system according to claim 1, further comprising a gesture detection means for detecting a gesture of the user when the user is to perform a manipulation on the screen, wherein
   when the gesture detection means detects the gesture, the display control means moves a position of the displayed screen to the suitable-for-manipulation position.

4. The display system according to claim 1, further comprising a line-of-vision detection means for detecting a line of vision of the user when the user gazes at a display object on the displayed screen, the display object being intended to accept a user's manipulation, wherein
   when the line-of-vision detection means detects the line of vision, the display control means moves a position of the displayed screen to the suitable-for-manipulation position.

5. The display system according to claim 1, further comprising a measurement means for geometrically measuring a body of the user, wherein
   the display control means calculates, as the suitable-for-manipulation position, a position obtained from a geometrical measurement result from the measurement means at which the user is able to easily perform a manual manipulation.

6. The display system according to claim 1, wherein when the screen to be displayed accepts a handwritten input, the display control means calculates, as the suitable-for-manipulation position, a position closer to the face of the user than when the screen to be displayed does not accept a handwritten input.

7. The display system according to claim 5, wherein the display control means displays the screen at the suitable-for-manipulation position in such a way that the more distant the position at which to display the screen is from the user, the larger a size of the screen is.

8. The display system according to claim 1, wherein the screen including visual content for appreciation is a screen including a moving picture.

9. The display system according to claim 1, wherein:
   the display system is a display system mounted in an automobile; and
   the touch panel display is a touch panel display on which the position at which to display the screen is variable in a front-back direction of the automobile.

10. A display system that displays a screen for a user, the system comprising:

a touch panel display that displays the screen and accepts a manipulation performed on the screen, a position at which to display the screen being variable; and a display control means for controlling a display of the screen on the touch panel display, wherein the display control means determines whether the screen to be displayed has visual content for appreciation according to a predetermined criterion; if the screen to be displayed includes no visual content for appreciation, the display control means displays the screen at a suitable-for-manipulation position comparatively close to the user; if the screen to be displayed has visual content for appreciation, the display control means displays the screen at a position comparatively distant from the user; and a measurement means for geometrically measuring a body of the user, wherein the display control means calculates, as the suitable-for-manipulation position, a position obtained from a geometrical measurement result from the measurement means at which the user is able to easily perform a manual manipulation.

11. The display system according to claim 10, wherein if the screen to be displayed has visual content for appreciation, the display control means calculates a position distant from the user by a distance suitable for viewing the visual content, included in the screen, for appreciation, the distance being obtained from a resolution of the visual content for appreciation and a display size of the visual content for appreciation.

12. The display system according to claim 10, further comprising a gesture detection means for detecting a gesture of the user when the user is to perform a manipulation on the screen, wherein when the gesture detection means detects the gesture, the display control means moves a position of the displayed screen to the suitable-for-manipulation position.

13. The display system according to claim 10, further comprising a line-of-vision detection means for detecting a line of vision of the user when the user gazes at a display object on the displayed screen, the display object being intended to accept a user's manipulation, wherein when the line-of-vision detection means detects the line of vision, the display control means moves a position of the displayed screen to the suitable-for-manipulation position.

14. The display system according to claim 10, wherein when the screen to be displayed accepts a handwritten input, the display control means calculates, as the suitable-for-manipulation position, a position closer to the face of the user than when the screen to be displayed does not accept a handwritten input.

15. The display system according to claim 10, wherein the screen including visual content for appreciation is a screen including a moving picture.

16. The display system according to claim 10, wherein:

the display system is a display system mounted in an automobile; and the touch panel display is a touch panel display on which the position at which to display the screen is variable in a front-back direction of the automobile.

17. A display system mounted in an automobile that displays a screen for a user, the system comprising:

a touch panel display that displays the screen and accepts a manipulation performed on the screen, a position at which to display the screen being variable; and a display control means for controlling a display of the screen on the touch panel display; wherein the display control means determines whether the screen to be displayed has visual content for appreciation according to a predetermined criterion; if the screen to be displayed includes no visual content for appreciation, the display control means displays the screen at a suitable-for-manipulation position comparatively close to the user; if the screen to be displayed has visual content for appreciation, the display control means displays the screen at a position comparatively distant from the user; and the display control means displays the screen in such a way that the more distant the position at which to display the screen is from the user, the larger a size of the screen is.

18. The display system according to claim 17, wherein if the screen to be displayed has visual content for appreciation, the display control means calculates a position distant from the user by a distance suitable for viewing the visual content, included in the screen, for appreciation, the distance being obtained from a resolution of the visual content for appreciation and a display size of the visual content for appreciation.

19. The display system according to claim 17, further comprising a measurement means for geometrically measuring a body of the user, wherein the display control means calculates, as the suitable-for-manipulation position, a position obtained from a geometrical measurement result from the measurement means at which the user is able to easily perform a manual manipulation.

20. The display system according to claim 17, wherein the screen including visual content for appreciation is a screen including a moving picture.

* * * * *